United States Patent [19]

Kageyama et al.

[11] Patent Number: 4,998,837
[45] Date of Patent: Mar. 12, 1991

[54] LEAD CARTRIDGE WITH AN OPENABLE CAPPING STRUCTURE

[75] Inventors: Hidehei Kageyama; Yoshihide Mitsuya, both of Kawagoe, Japan

[73] Assignee: Kotobuki & Co., Ltd., Kyoto, Japan

[21] Appl. No.: 353,151

[22] Filed: May 12, 1989

Related U.S. Application Data

[63] Continuation of Ser. No. 219,894, Jul. 14, 1988, abandoned, which is a continuation of Ser. No. 865,782, May 22, 1986, abandoned.

[30] Foreign Application Priority Data

May 23, 1985 [JP] Japan .................. 62-75697

[51] Int. Cl.⁵ .............................................. B43K 21/00
[52] U.S. Cl. ........................................ 401/85; 401/65; 401/89
[58] Field of Search ...................... 401/85–87, 401/89, 92, 65, 66, 67

[56] References Cited

U.S. PATENT DOCUMENTS

| | | | |
|---|---|---|---|
| 1,592,502 | 7/1926 | Pollak | 401/65 |
| 2,184,911 | 12/1939 | Fend | 401/65 |
| 2,626,592 | 1/1953 | Hedler | 401/67 |
| 4,269,524 | 5/1981 | Hashimoto | 401/65 |
| 4,275,971 | 6/1981 | Katz | 401/65 X |
| 4,500,220 | 2/1985 | Hashimoto | 401/67 X |
| 4,583,874 | 4/1986 | Kageyama | 401/85 |
| 4,603,990 | 8/1986 | Yamamoto | 401/89 X |
| 4,619,539 | 10/1986 | Kageyama | 401/85 |
| 4,659,242 | 4/1987 | Katz | 401/85 |
| 4,836,703 | 6/1989 | Kageyama et al. | 401/65 |

FOREIGN PATENT DOCUMENTS 3401647 1/1986 Fed. Rep. of Germany ........ 401/85

*Primary Examiner*—Peter M. Cuomo
*Attorney, Agent, or Firm*—Sherman and Shalloway

[57] ABSTRACT

A lead cartridge for a mechanical pencil, provided with an openable capping structure. The openable capping structure is fixedly joined to the open end, namely, the front end, of the lead cartridge so as to engage the lead guide of the mechanical pencil when the lead cartridge is inserted in the mechanical pencil. The openable capping structure opens a lead passage formed therein when engaged with the lead guide and closes the lead passage when separated from the lead guide to prevent the leads contained in the lead cartridge falling off the lead cartridge.

10 Claims, 17 Drawing Sheets

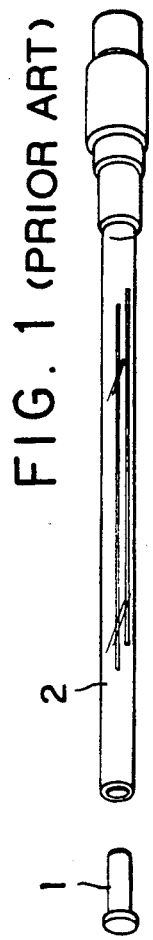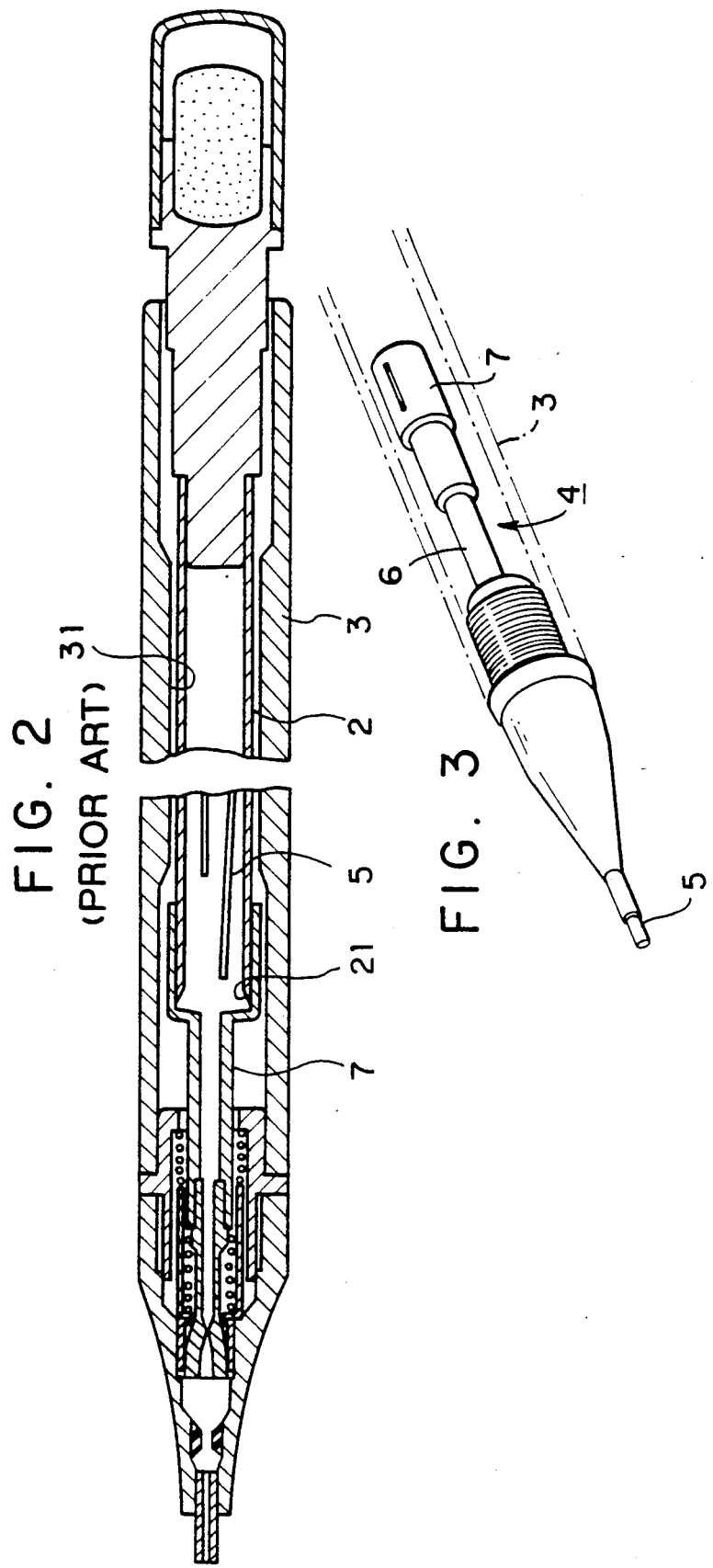
FIG. 1 (PRIOR ART)
FIG. 2 (PRIOR ART)
FIG. 3

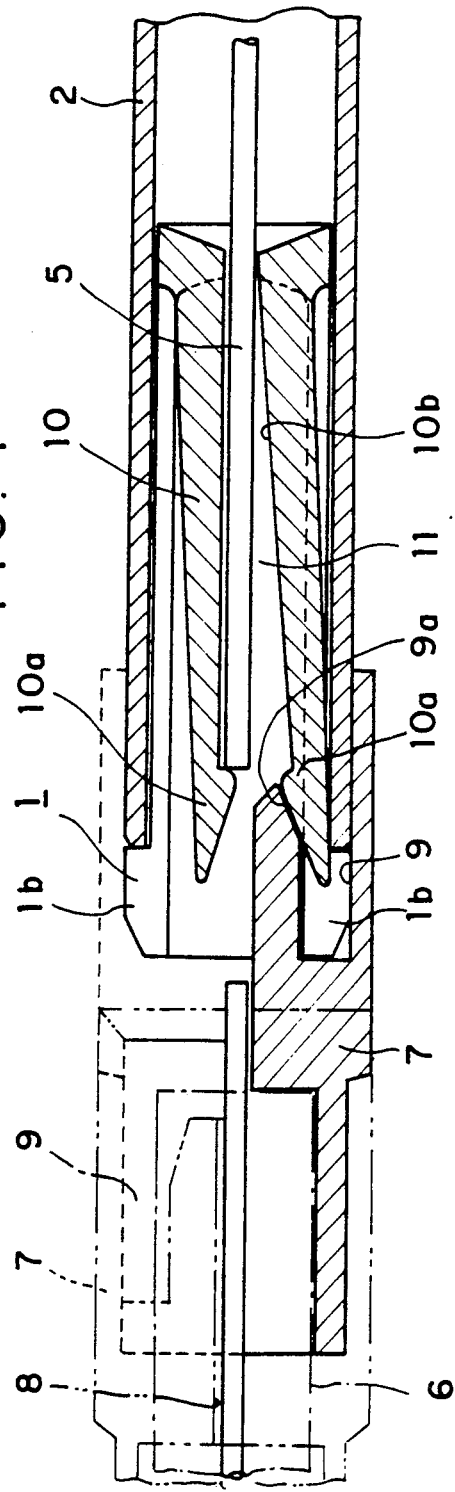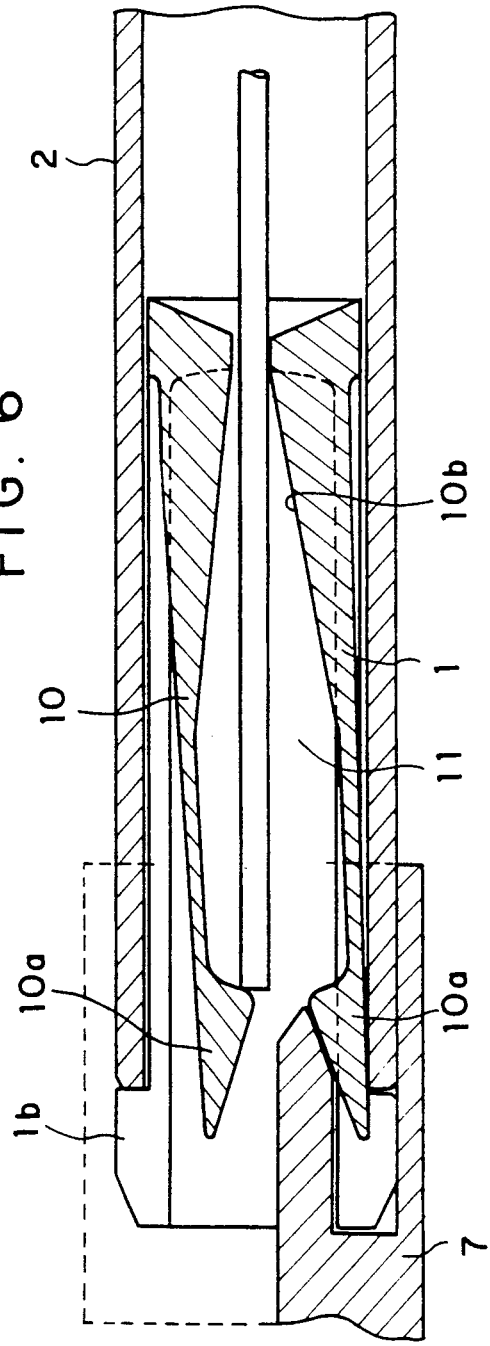

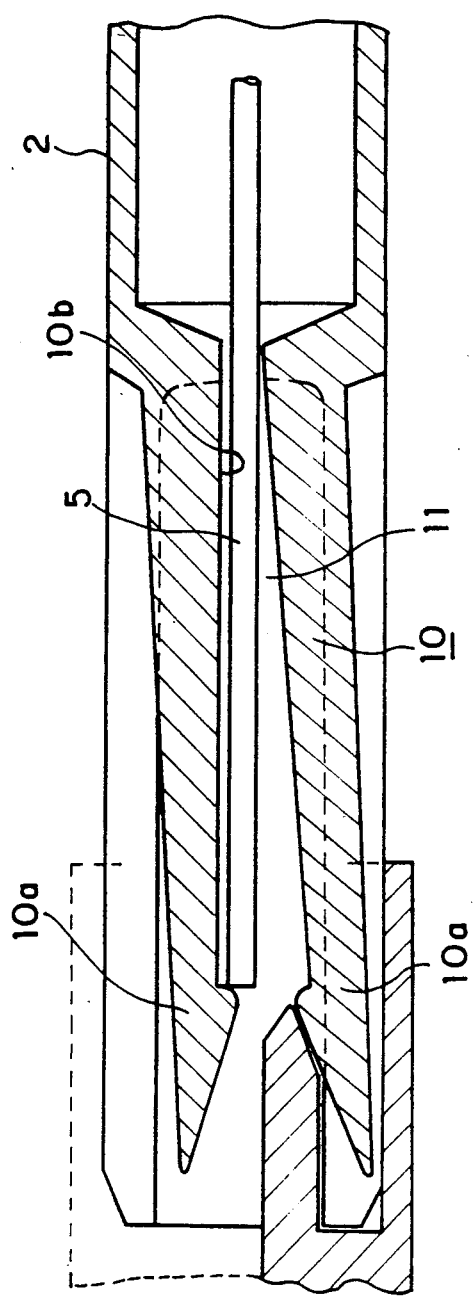
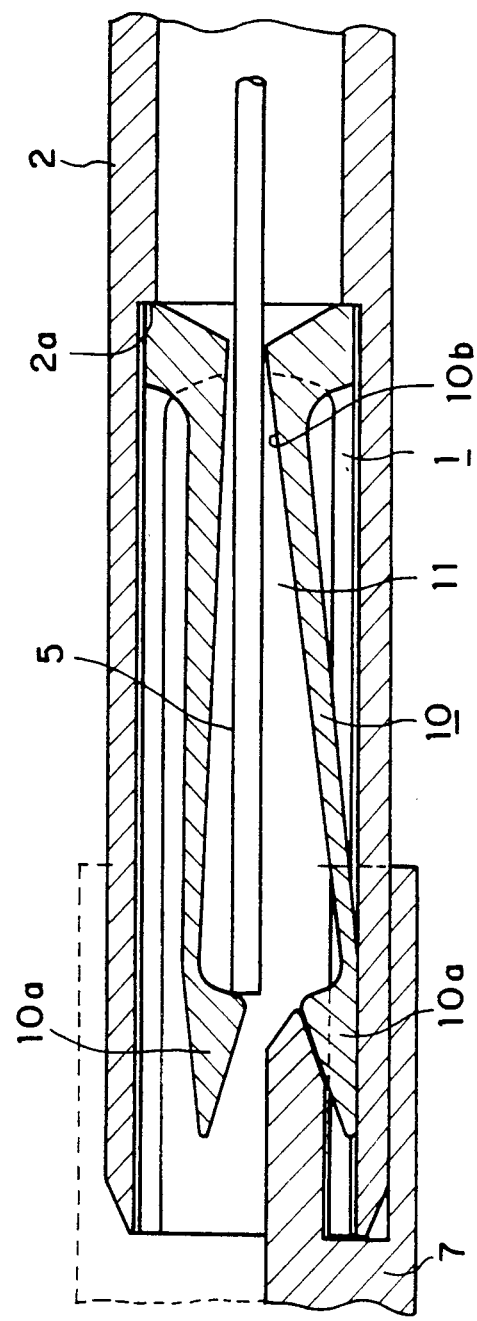
FIG. 10
FIG. 11

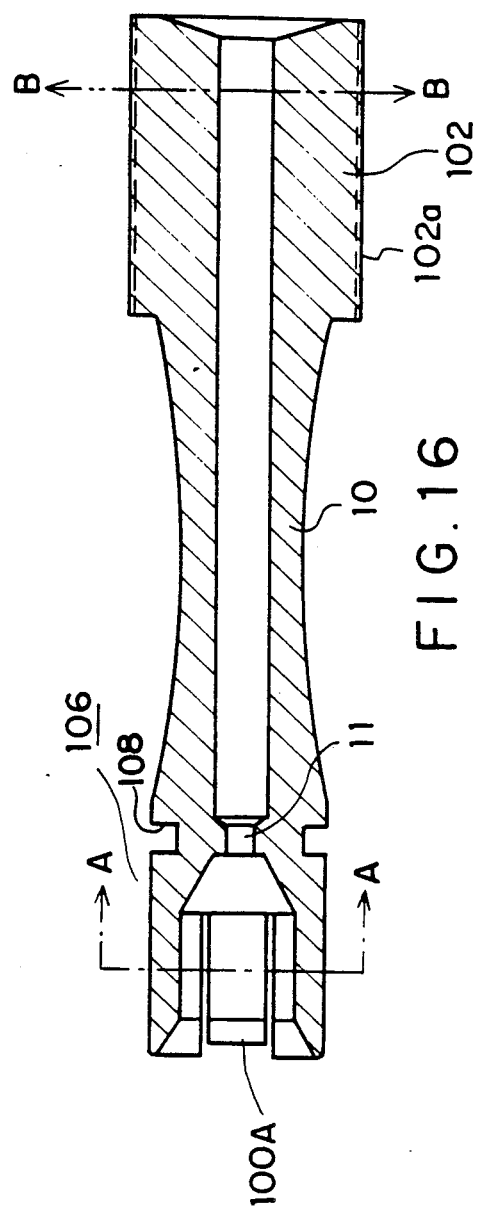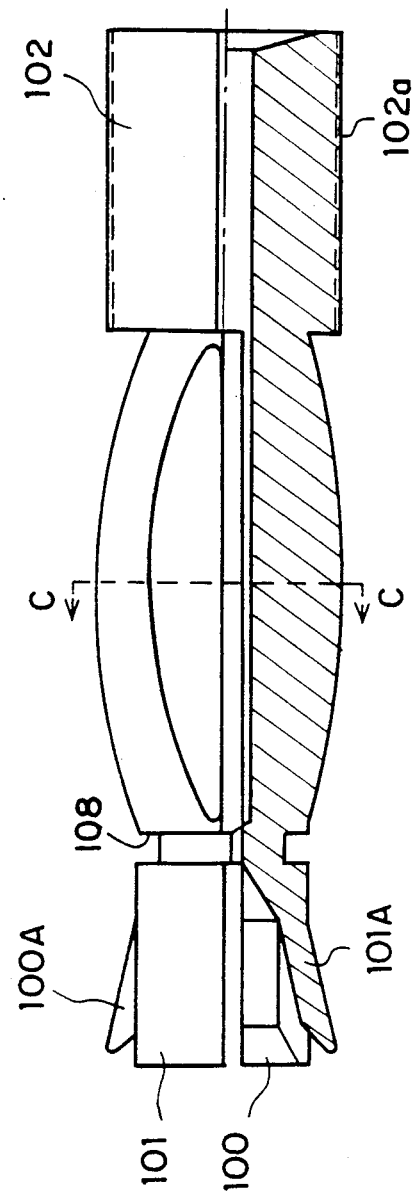
FIG. 15
FIG. 16

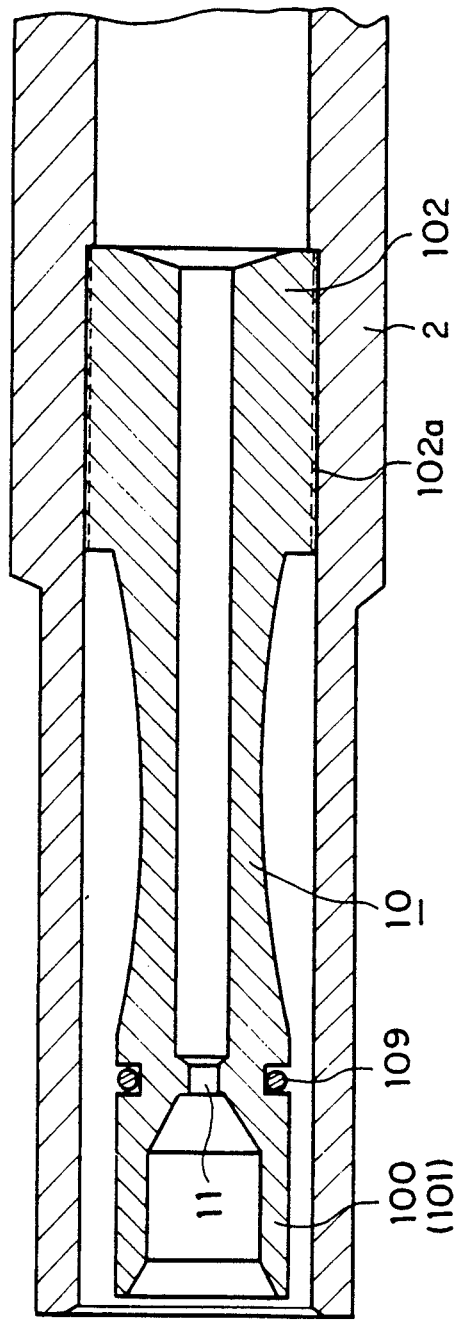
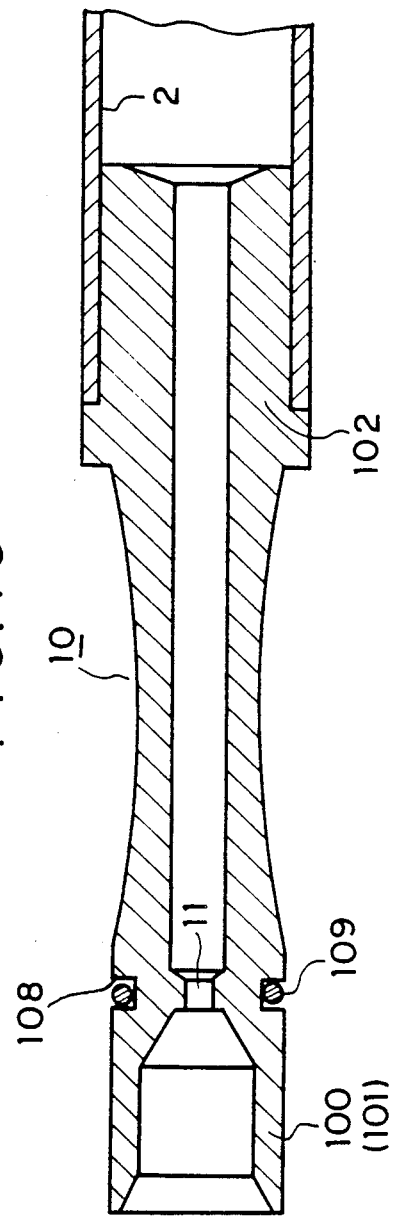

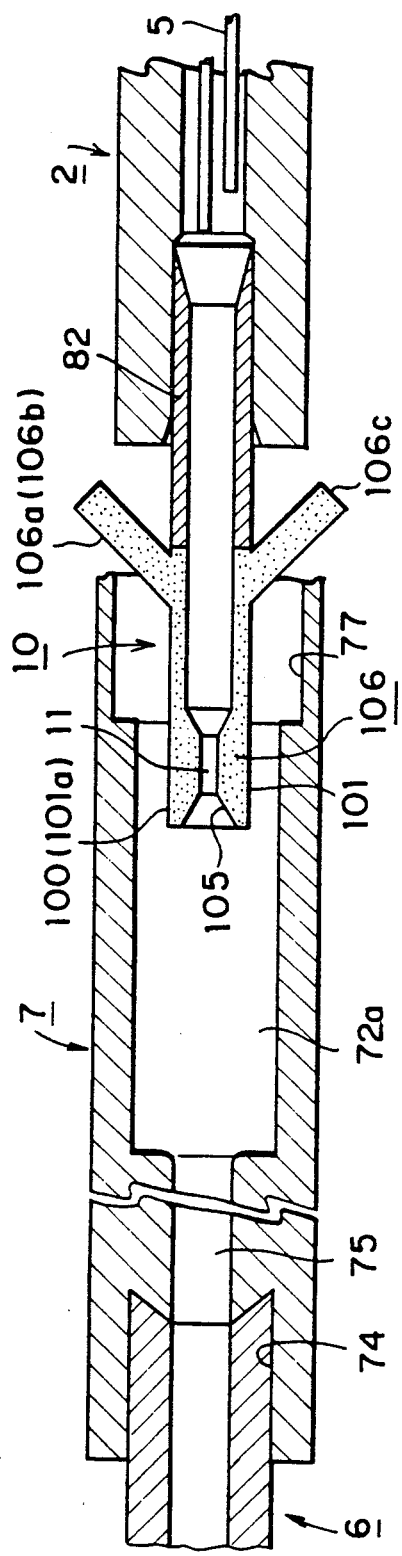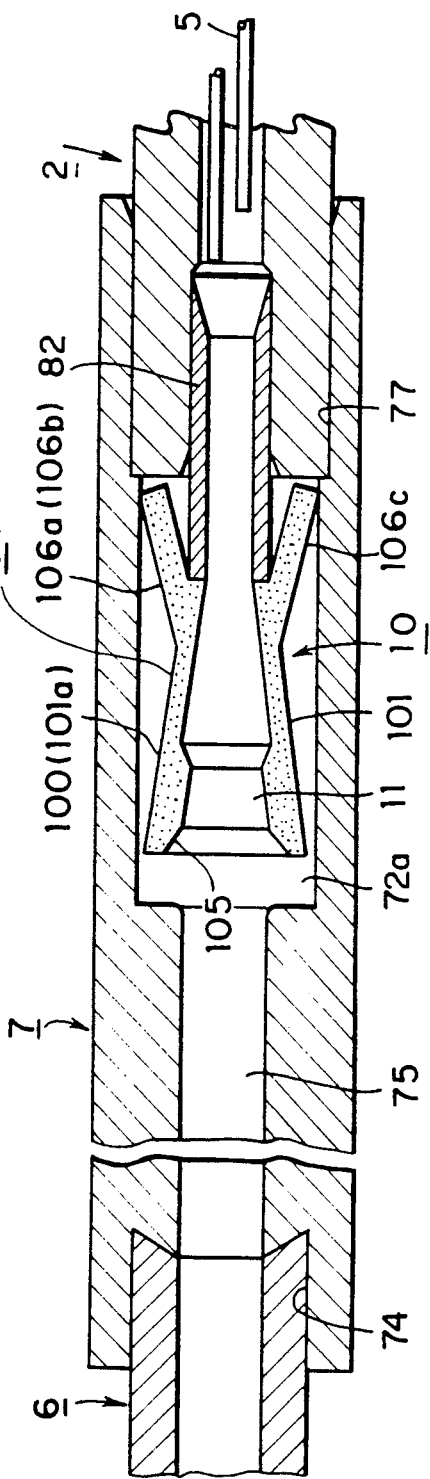

FIG. 24
FIG. 25
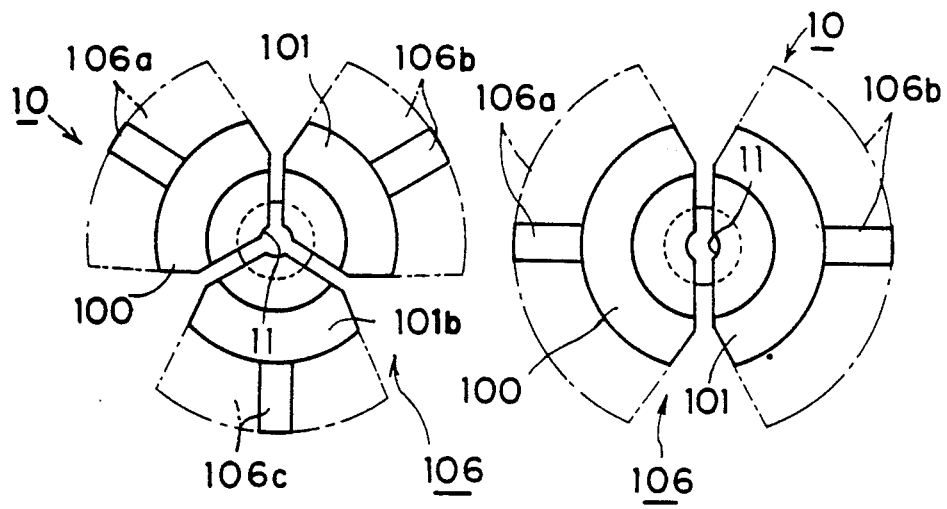
FIG. 26
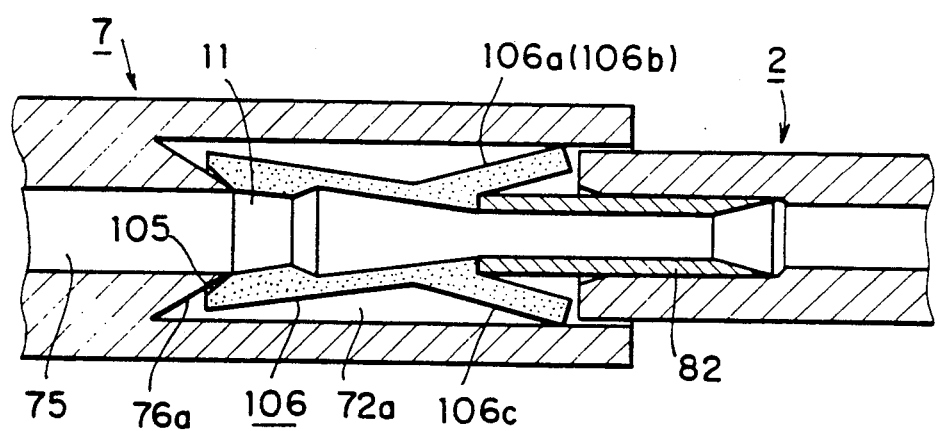

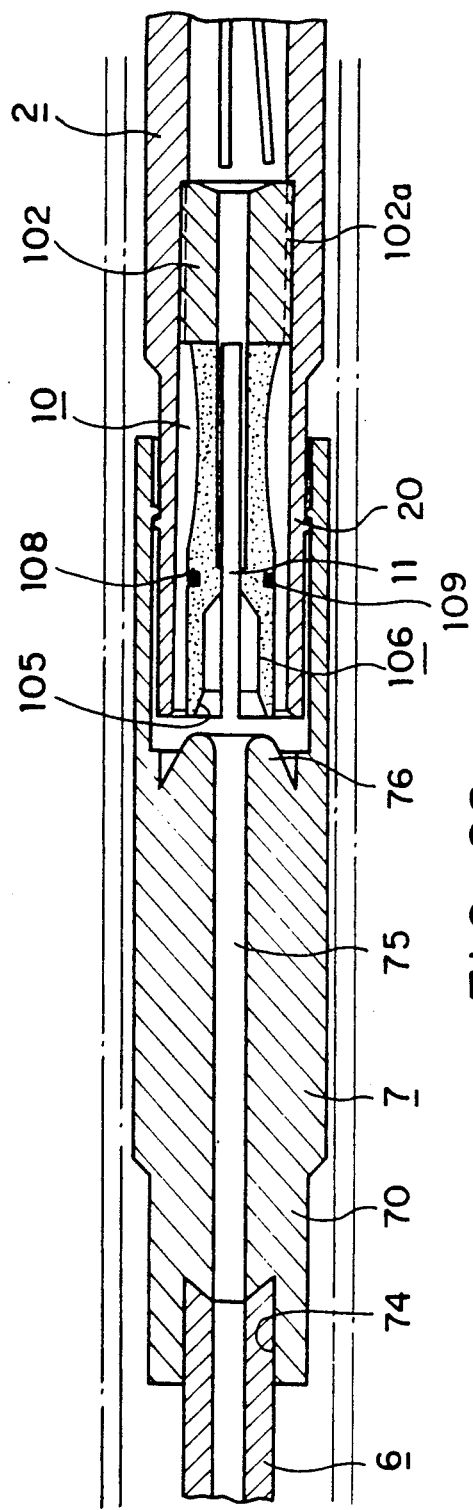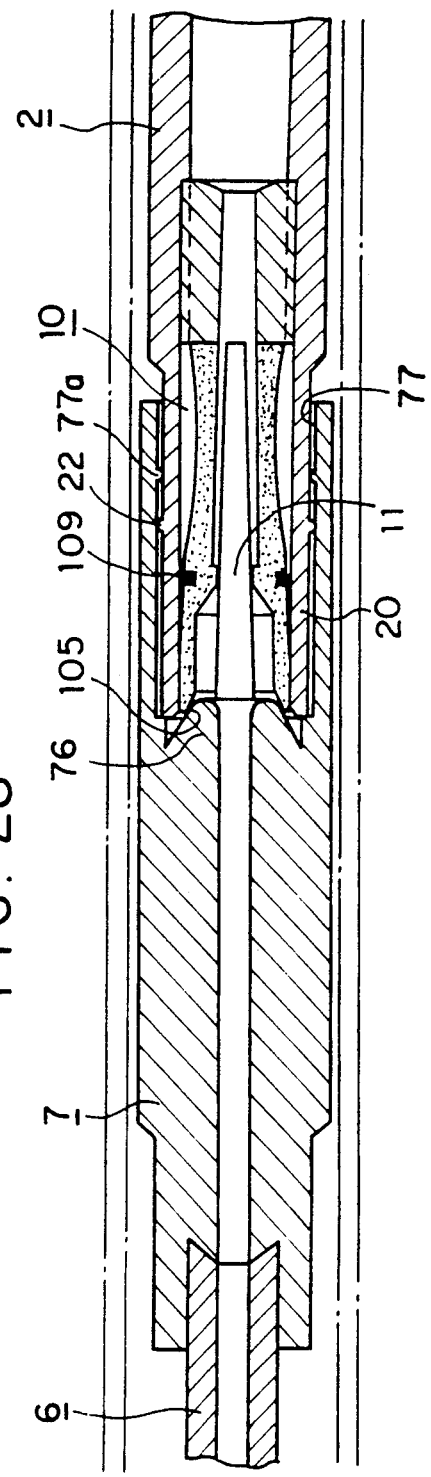

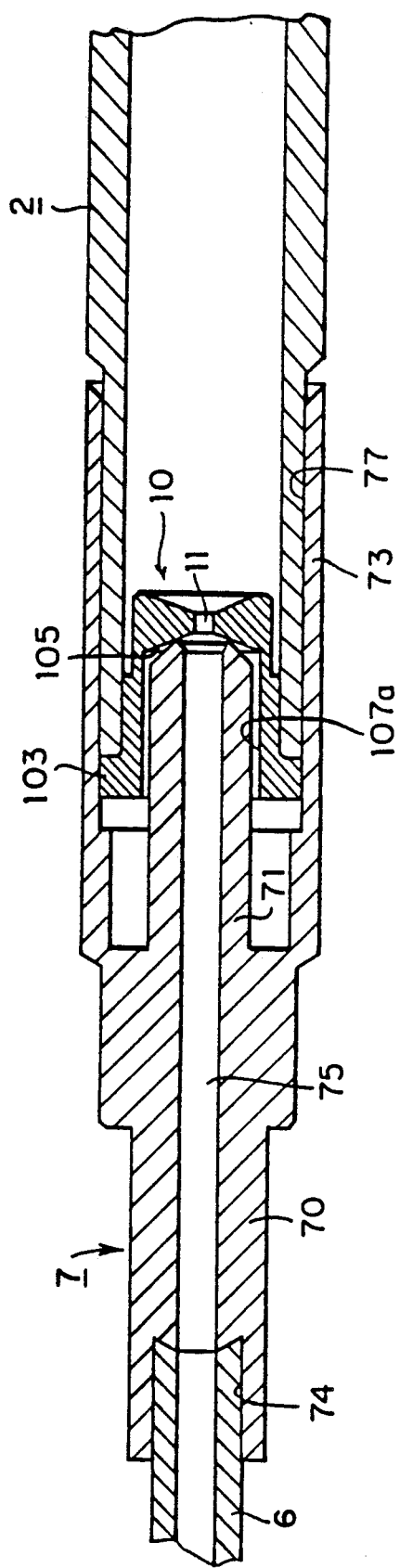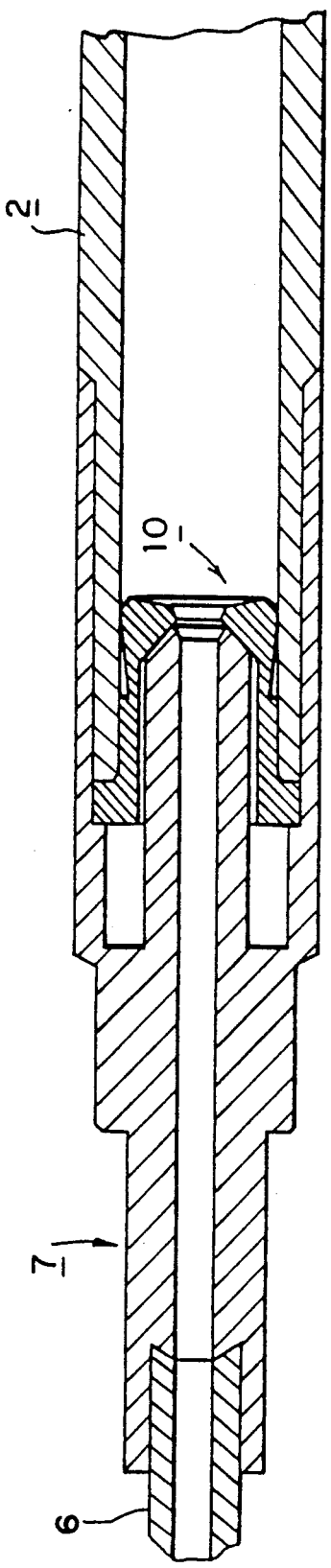

LEAD CARTRIDGE WITH AN OPENABLE CAPPING STRUCTURE

This application is a continuation-in-part, continuation division of application Ser. No. 219,894 filed July 14, 1988, now abandoned, which is in turn a continuation of application Ser. No. 865,782, filed May 22, 1986, now abandoned.

BACKGROUND OF THE INVENTION

1. Field of the Invention

The present invention relates to a lead cartridge with an openable capping structure, for so-called cartridge type mechanical pencils.

2. Description of the Prior Art

Recently there has been proposed a so-called cartridge type mechanical pencil, such as illustrated in FIG. 1, in which the lead cartridge is changed for another one for changing the leads being used for leads or for replenishing the mechanical pencil with leads, instead of changing or supplying the leads individually, so that the leads are changed for different leads or the mechanical pencil can be replenished with leads without soiling the hand.

In changing leads or supplying leads to the conventional cartridge type mechanical pencil, a cap 1 covering the open end of a lead cartridge 2 is removed and thrown away, and then the lead cartridge 2 is fitted in the cylinder of the mechanical pencil with the front end open. Accordingly, the leads contained in the lead cartridge 2 are liable to fall off the lead cartridge 2 if the open end of the lead cartridge is directed downward even slightly. Therefore, in fitting the cartridge 2 in the cylinder, the lead cartridge must be held with the open end thereof directed upward and to be fitted carefully into the cylinder or the mechanical pencil.

On the other hand, in removing the lead cartridge 2 from the cylinder 3, the leads slip off the lead cartridge 2 if the open end of the lead cartridge 2 is directed downward even slightly, and hence remain in the cylinder 3.

Furthermore, as illustrated in FIG. 2, the conventional mechanical pencil accommodates the lead cartridge 2 containing a plurality of leads, and a lead guide 7 detachably holding the lead cartridge 2 in the cylinder 3 thereof, and the residual leads are returned into the lead cartridge 2 in removing the lead cartridge 2 from the cylinder 3. Therefore, the inner surface of the open end of the lead cartridge 2 needs to be tapered to form a taper surface 21 and an inner expansion 31 needs to be formed in a portion of the cylinder 3, so that the inside diameter of the cylinder is reduced partly in a portion corresponding to the inner expansion 31 limiting the outside diameter of the lead cartridge 2, and thereby the capacity of the lead cartridge 2 is reduced. Furthermore, since it is impossible to form such a cylinder 3 having such an inner expansion 31 through extrusion molding, the cylinder 3 needs to be formed through injection molding, which requires a molding die which is more expensive than that for extrusion molding.

SUMMARY OF THE INVENTION

The present invention has been made to solve the problems of the conventional lead cartridge. Accordingly, it is an object of the present invention to provide a lead cartridge provided with an openable capping structure which is opened to form a lead passage when the lead cartridge is fitted in a mechanical pencil and is closed when the same is removed from the mechanical pencil, capable of preventing the leads falling off the lead cartridge, eliminating the use of parts to be thrown away in fitting the lead cartridge in a mechanical pencil, enabling the formation of the cylinder of the mechanical pencil through extrusion molding, and having an increased capacity.

According to one aspect of the present invention, in order to achieve the object of the invention, there is provided a lead cartridge with an openable capping structure, comprising: a cartridge body for containing a plurality of leads, capable of being detachably fitted in a mechanical pencil for supplying or changing leads; and an openable capping structure joined to the open end of the cartridge body, capable of opening to form a lead passage when engaged with the lead guide of the mechanical pencil and capable of closing the lead passage when disengaged from the lead guide of the mechanical pencil.

The above and other objects, features and advantages of the present invention will become more apparent from the following description of the preferred embodiment thereof taken in conjunction with the accompanying drawings.

BRIEF DESCRIPTION OF THE DRAWINGS

FIG. 1 is a perspective view of a conventional lead cartridge;

FIG. 2 is a longitudinal sectional view of a conventional cartridge type mechanical pencil;

FIG. 3 is a fragmentary schematic perspective view of a lead projecting mechanism with which a lead cartridge embodying the present invention is combined;

FIG. 6 is a fragmentary longitudinal sectional view of a variation of the lead cartridge of FIG. 4;

FIGS. 10 and 11 are longitudinal sectional views of other variations of the first embodiment;

FIG. 15 is a longitudinal sectional view of an openable capping structure employed in the third embodiment;

FIG. 16 is a partly sectional plan view of the openable capping structure of FIG. 15, in which the openable capping structure of FIG. 15 is turned through 90° about the longitudinal center axis thereof;

FIGS. 18 and 19 are longitudinal sectional views of fourth and fifth embodiments of the present invention, respectively;

FIGS. 22 and 23 are longitudinal sectional view of a seventh embodiment of the present invention;

FIGS. 24 and 25 are end views of the openable capping structure of the seventh embodiment, respectively;

FIG. 26 is a longitudinal sectional view of a variation of the seventh embodiment;

FIGS. 27 and 28 are longitudinal sectional views of a eighth embodiment of the present invention;

FIGS. 31 and 32 are longitudinal sectional views of a ninth embodiment of the present invention.

DESCRIPTION OF THE PREFERRED EMBODIMENTS

Figure 4A:
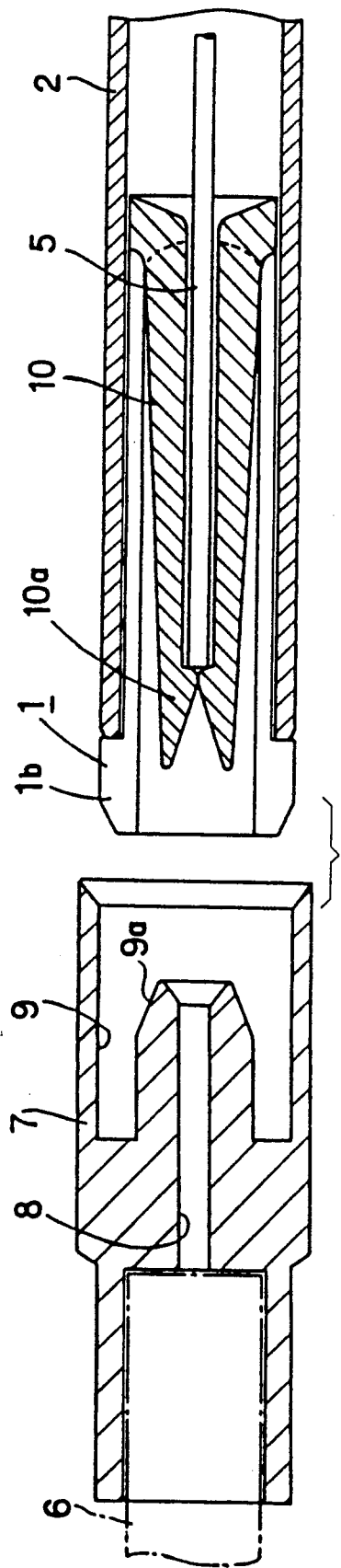
FIGS. 4a and 4b show cross-sectional views of the essential portions of a first embodiment of the present invention in respective uncoupled and coupled positions.
Figure 4B:
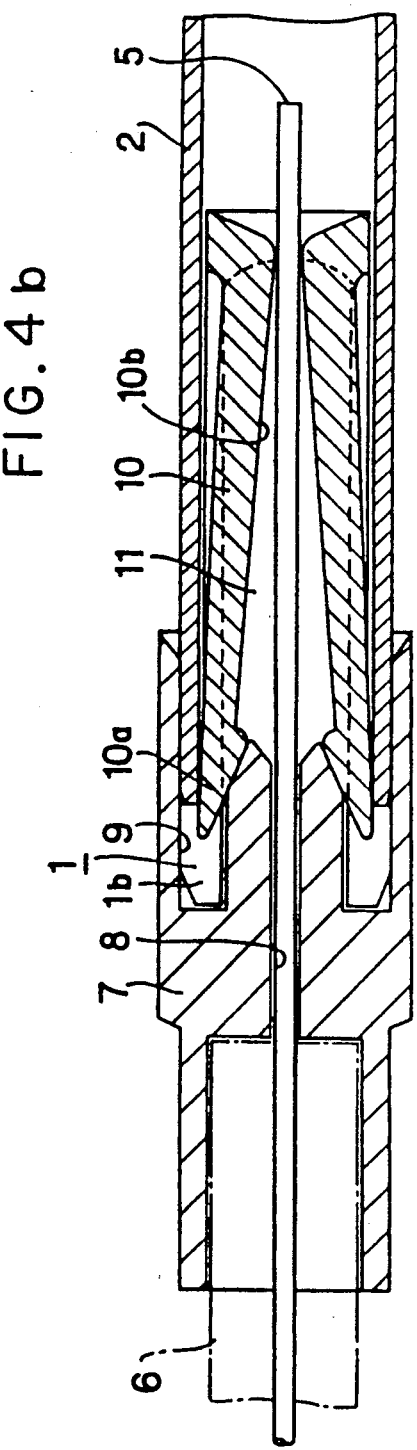
Figure 5:
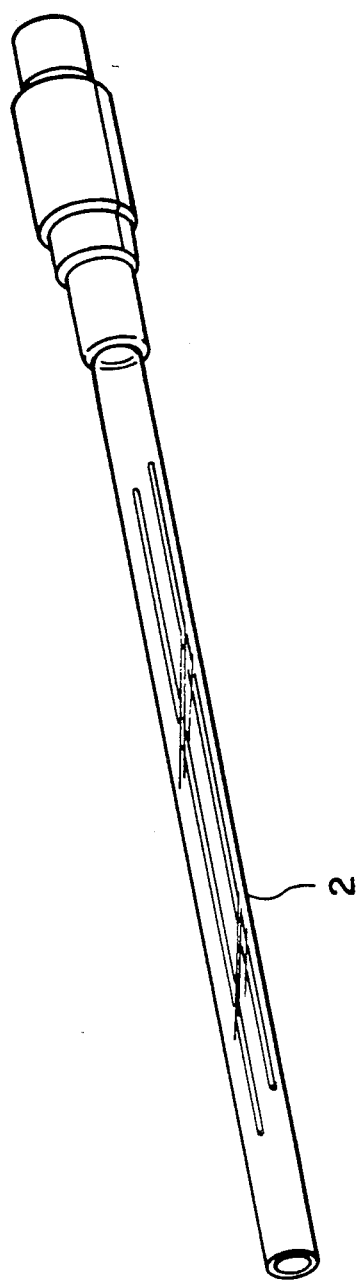
FIG. 5 is a perspective view of the first embodiment of FIG. 4.

Referring to FIG. 3 showing part of a lead projecting mechanism 4 provided within the outer cylinder 3 of a mechanical pencil, a lead guide 7 is fitted on the rear end of a lead chuck 6. A chuck coupling may be provided between the lead chuck 6 and the lead guide 7. As shown in FIG. 4, the lead guide has a lead passage 8 having a diameter allowing the passage of only a single lead 5 at a time, and a substantially annular space 9 formed in the rear end thereof behind the lead passage 8. As illustrated in FIGS. 4a, 4b and 5, an openable capping structure 10, which is the essential constitution of the present invention, is fitted at the rear end thereof in the free end, namely, the front end, of a lead cartridge 2 containing a plurality of leads 5 and is capable of being detachably fitted at the front end thereof in the annular space 9 of the lead guide 7 to detachably join the lead cartridge 2 to the lead guide 7. In the first embodiment, the openable capping structure 10 has a pair of elastic tongues 10a normally bent toward each other to close a lead passage 11 formed in the openable capping structure 10. When the openable capping structure 10 is fitted in the lead guide 7, the elastic tongues 10a elastically engage the tapered surface 9a of the inner wall of the annular space 9 to open the lead passage 11. The inner surface 10b of each elastic tongue 10a is sloped so as to define a tapered space tapering toward the cartridge 2 so that leads 5 remaining in the outer cylinder 3, if any, can be smoothly received in the lead cartridge 2 when the lead cartridge 2 is inserted into the outer cylinder 3. FIG. 6 illustrates a variation of the openable capping structure 10, in which the shape of the inner surface 10b of the elastic tongue 10a is different from that of the elastic tongue of FIGS. 4a and 4b. The shape of the inner surface 10b of the elastic tongue 10a need not necessarily be limited to those shown in FIGS. 4a, 4b and 6, but may be any shape provided that the leads 5 remaining within the outer cylinder 3 can be smoothly received in the cartridge 2 when the cartridge 2 is inserted into the outer cylinder 3.

Figure 7:
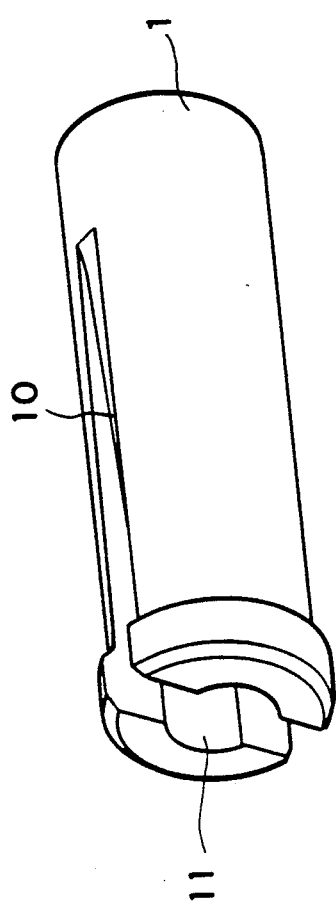
FIGS. 7 to 9 are perspective views of an openable capping structure of the first embodiment.
Figure 8:
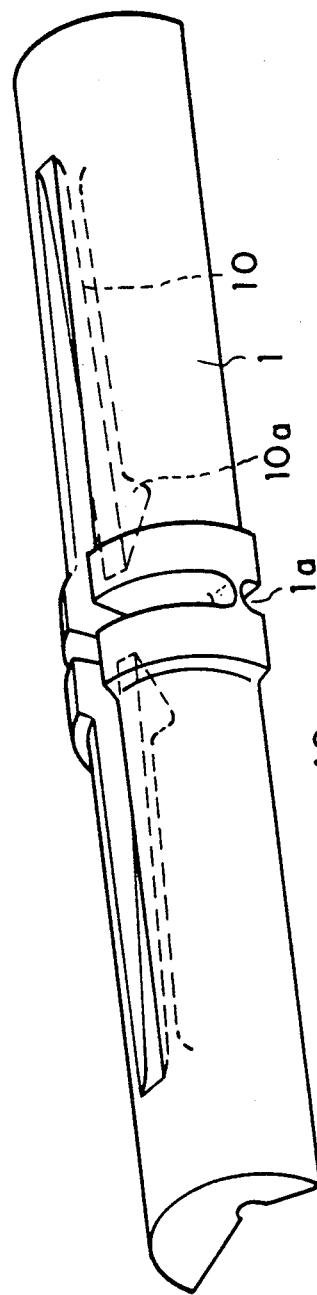
Figure 9:
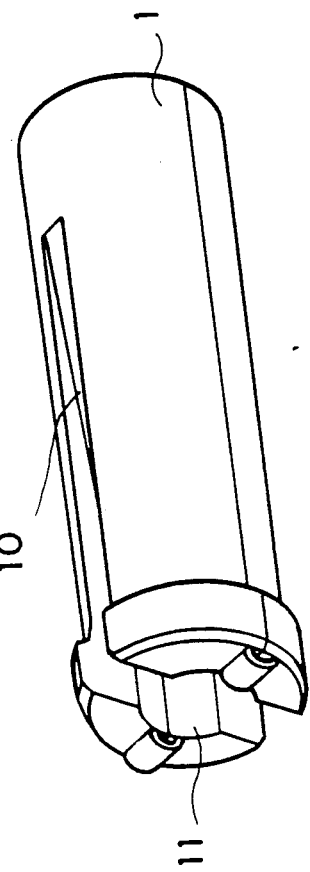

The openable capping structure 10 can be formed through various means; the openable capping structure 10 may be formed integrally in a form as shown in FIG. 7 or may be formed by bending a member as shown in FIG. 8 at the central joints 1a thereof in a form as shown in FIG. 9. Although the openable capping structure 10 of the first embodiment and the lead cartridge 2 are formed separately, the openable capping structure 10 and the cartridge 10 may be formed in an integral member as shown in FIG. 10. Furthermore, an annular shoulder 2a may be formed in the lead cartridge 2 to receive the openable capping structure 10 thereon as shown in FIG. 11.

The function of the first embodiment of the present invention will be described hereinafter. In supplying leads or in changing the lead being used for different leads, the lead cartridge 2 being used is removed from the mechanical pencil, and then a new lead cartridge 2 is inserted through the rear end of the outer cylinder 3 into the outer cylinder 3. Then, the openable capping structure 10 is automatically in the lead guide 7. When the lead cartridge 2 is positioned in place, the flange 1b of the openable capping structure 10 is received closely in the annular space 9 of the lead guide 7 while the elastic tongues 10a of the openable capping structure 10 engage elastically the tapered surface 9a of the inner wall of the annular space 9, and thereby the lead passage 11 is opened to supply the leads 5. Since the elastic tongues 10a engage the inner wall of the annular space 9 elastically, the lead cartridge 2 is joined firmly to the lead guide 7.

Thus, since the openable capping structure 10 opens only when joined to the lead guide 7, there is no possibility of the leads contained in the lead cartridge 2 falling off the lead cartridge 2 in inserting the lead cartridge 2 into the outer cylinder 3 of the mechanical pencil. Accordingly, it is not necessary to hold the mechanical pencil upside down and to insert the lead cartridge 2 upward into the outer cylinder in replacing the lead cartridge, and hence the lead cartridge 2 can easily and simply replaced.

The lead guide 7 and the openable capping structure 10 may be designed so that the openable capping structure 10 is opened by the lead guide 7 before the openable capping structure 10 comes into contact with the lead remaining in the outer cylinder 3 and being chucked by the lead chuck 6 by taking the length of the lead 5 into consideration.

In removing the lead cartridge 2 still containing the leads 5 from the lead guide 7, the elastic tongues 10a of the openable capping structure return elastically to their original position to close the lead passage 11 upon the disengagement of the openable capping structure 10 from the taper surface 9a of the lead guide 7, and hence the residual leads 5 will never fall off the lead cartridge 2 and no lead remains in the outer cylinder 3. Naturally, the lead 5 chucked by the lead chuck 6 remains in the outer cylinder, however, this lead 5 will never fall off the outer cylinder 3 because the same is chucked by the lead chuck 6.

Thus, the openable capping structure 10 functions as a coupling member as well as a cap. Therefore, the first embodiment of the present invention does not have any member to be thrown away, does not require the removal of the cap and enables simple replacement of the lead cartridge 2. Furthermore, since the lead passage 11 is opened only when the openable capping structure engages the lead guide 7, the falling of the leads 5 off the lead cartridge 2 can be surely prevented in changing the lead cartridge 2.

Figure 12:
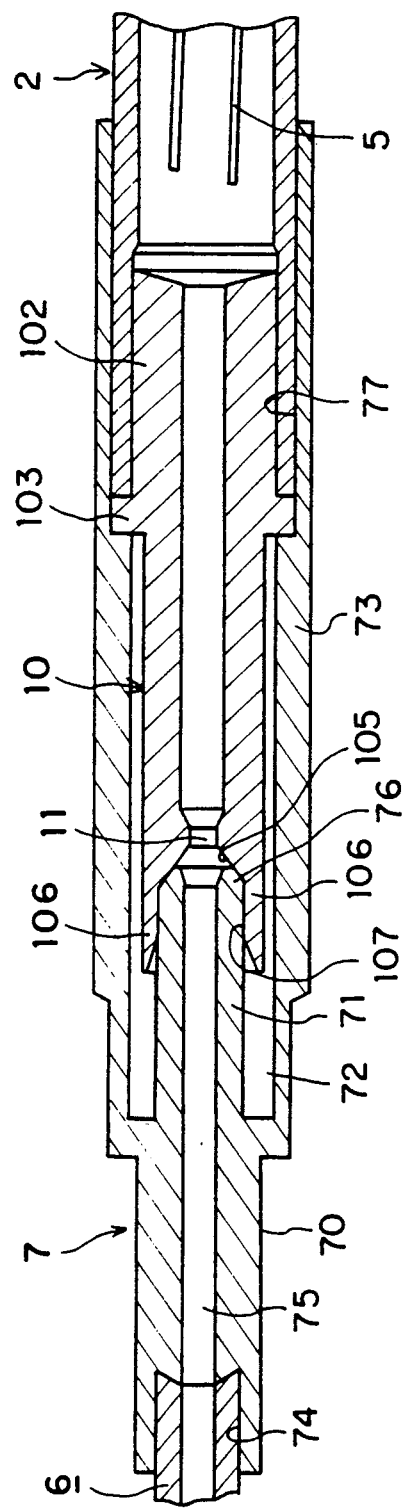
FIG. 12 is a longitudinal sectional view of a second embodiment of the present invention.
Figure 13:
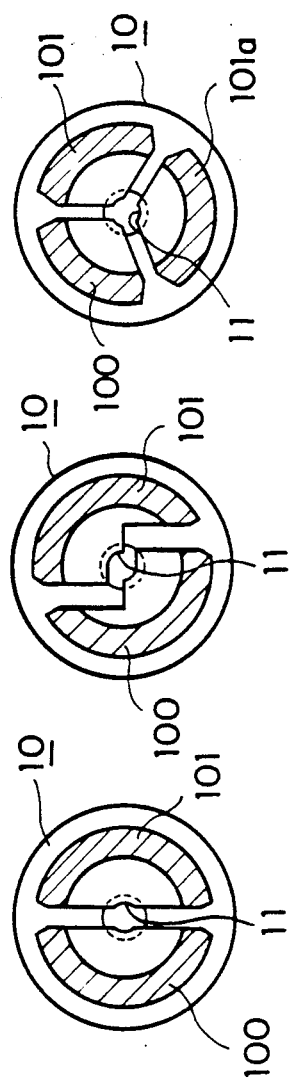
FIGS. 13a, 13b and 13c are sectional views of the possible forms of the head of an openable capping structure according to the present invention.

FIGS. 12 and 13 illustrate a second embodiment of the present invention. The second embodiment is different from the first embodiment in that an openable capping structure 10 is projected from the front end of a lead cartridge 2.

Referring to FIG. 12, a lead guide 7 comprises a front cylindrical portion 70, an inner rear cylindrical portion 71 coaxially extending from the rear end of the front cylindrical portion 70, and an outer cylindrical portion 73 coaxially extending from the rear end of the front cylindrical portion 70 beyond the extremity of the inner cylindrical portion 71 so as to form an annular space 72 between the inner circumference thereof and the outer circumference of the inner rear cylindrical portion 71. A receiving hole 74 for receiving the rear end of the lead chuck 6 is formed in the front end of the front cylindrical portion 70 of the lead guide 7. A lead supply passage 75 is formed coaxially through the front cylindrical portion 70 and the inner rear cylindrical portion 71 from the receiving hole 74. The lead supply passage 75 has a diameter substantially corresponding to the outside diameter of the lead 5 to allow the passage of a single lead 5 therethrough at a time. The rear end of the inner rear cylindrical portion 71 is tapered to form a tapered surface 76. The inside diameter of the outer rear cylindrical portion 73 is increased in the rear end portion thereof to form a cartridge receiving hole 77. A plurality of ridges or furrows may be formed in in the inner circumference of the cartridge receiving hole 77 to enable the smooth insertion of the lead cartridge 2 into or removal of the same from the cartridge receiving hole 77.

A chuck type openable capping structure 10 incorporated into the lead cartridge 2 is detachably fitted in the lead guide 7. The front portion of the chuck type openable capping structure 10 is slotted longitudinally into a plurality of sections, such as two equal chucking sections 100 and 101 (FIG. 13a), two different chucking sections 100 and 101 (FIG. 13b) or three equal chucking tongues 100, 101 and 101a (FIG. 13c). The rear portion 102 of the chuck type openable capping structure 10 is received in the front opening of the lead cartridge 2 with a flange 103 formed between the front portion consisting of the chucking tongues 100 and 101 (and 101a) and the rear portion 102 in abutment with the open end of the lead cartridge 2. When the openable capping structure 10 is thus fitted in the lead guide 7, a lead passage 11 is formed along the longitudinal center axis of the openable capping structure 10. The diameter of the lead passage 11 when opened, may be such as to allow the individual passage of leads 5 having the same specific diameter, such as 0.5 mm, 0.7 mm or 0.9 mm, or such as to allow the individual passage of leads 5 having different diameters, such as 0.5 mm and 0.7 mm, respectively. That is, the chucking sections 100 and 101 (and 101a) are formed so as to be bendable so that the lead passage 11 allows the individual passage of leads 5 having the same specific diameter, such as 0.5 mm, 0.7 mm or 0.9 mm, or so that the lead passage 11 allows the individual passage of leads 5 having different diameters, for example, 0.5 mm and 0.7 mm, respectively. The chucking tongues 100 and 101 (and 101a) can bend so as to reduce the diameter of the lead passage 11 to an extent to inhibit the passage of the lead 5. A lead guide receiving hole 107 is formed in the front end of the openable capping structure 10 and the rear portion of the inner surface of the hole 107 is tapered rearward to form a taper surface 105. When the taper surface 105 engages the taper surface 76 of the inner rear cylindrical portion 71 of the lead guide 7, the lead passage 11 is opened. The chucking tongues 100 and 101 (and 101a) forming the front portion of the openable capping structure 10 bend elastically radially inward when the openable capping member 10 is separated from the lead guide 7 to close the lead passage 11. When the lead cartridge is inserted into the outer cylinder 3 of a mechanical pencil so as to receive the rear end portion of the inner rear cylindrical portion 71 of the lead guide 7 in the lead guide receiving hole 107, the chucking tongues 100 and 101 (and 101a) are bent radially outward to open the lead passage 11 and the rear end of the inner rear cylindrical wall 71 of the lead guide 7 is received elastically in the receiving hole 107.

The function of the second embodiment of the present invention will be described hereinafter.

When the lead cartridge 2 is removed together with the openable capping structure 10 from the lead guide 7 to change the leads or to confirm the number of the remaining leads, the lead passage 11 is narrowed automatically to a diameter that inhibits the passage of the lead 5 therethrough, for example, to a diameter below 0.5 mm. Accordingly, there is no possibility of the leads 5 falling off the lead cartridge 2 and remaining in the outer cylinder 3. Furthermore, since the leads are never left in the outer cylinder 3 the inner surface of the front end of the lead cartridge 2 need not be chamfered or tapered, and hence problems in molding the lead cartridge 2 due to the thin wall of the front end of the lead cartridge 2, such as misrun, do not occur. Still further, since the outer cylinder 3 need not be provided with an inner expansion, the outer cylinder 3 can be formed through extrusion molding, which is less costly than injection molding and the outside diameter of the lead cartridge 2 can be increased to increase the capacity of the lead cartridge remarkably. The lead 5 extending over the lead supply passage 75 of the inner rear cylindrical portion 71 and the lead passage 11 of the openable capping structure 10 is chucked by the chucking tongues 100 and 101 (and 101a) of the openable capping structure 10 when the openable capping structure 10 is removed from the lead guide 7 and is removed from the outer cylinder 3. The lead 5 thus withdrawn from the outer cylinder 3 together with the lead cartridge 2 is extracted from or pushed into the lead cartridge 2 through the lead passage 11 to prevent the breakage of the lead 5 during the withdrawal of the lead cartridge 2 from the outer cylinder 3 and the clogging of the lead guide 7 with a broken piece of the lead 5. After removing the lead cartridge 2 from the outer cylinder 3, a new lead cartridge 2 is inserted into the outer cylinder 3 through the rear end of the outer cylinder 3 so as to elastically receive the rear end of the inner rear cylindrical portion 71 of the lead guide 7 in the lead guide receiving hole 107 of the openable capping structure 10 to open the lead passage 11 of the openable capping structure 10 so that the leads 5 contained in the lead cartridge 2 are fed through the lead passage 11 to the lead projecting mechanism of the mechanical pencil. Thus, in changing the lead cartridge 2 being used for a new lead cartridge 2, the lead passage 11 remains closed until the rear end of the inner rear cylindrical portion 71 of the lead guide 7 is received in the lead guide receiving hole 107. Accordingly, the leads 5 never fall off the new lead cartridge 2. Since the mechanical pencil need not be held upside down and the lead cartridge 2 need not be held with the open end up in inserting the lead cartridge 2 into the mechanical pencil, the lead cartridge 2 can be replaced very simply and easily regardless of the position of the mechanical pencil. Particularly, since the chucking tongues 100 and 101 (101a) of the openable capping structure 10 have a tendency to bend radially inward and are capable of being bent radially outward, a new lead cartridge 2 containing leads 5 having a diameter different from that of the leads 5 contained in the lead cartridge 2 being used, as well as a new lead cartridge 2 containing leads 5 having the same diameter as that of the leads 5 contained in the lead cartridge 2 being used, can be joined to the lead guide 7 to feed the leads 5 having such a different diameter. Since the openable capping structure 10 has the elastic chucking tongues 100 and 101 (101a), the diameter of the lead passage 11 defined by the elastic chucking tongues 100 and 101 (101a) is variable, so that the openable capping structure 10 is capable of passing leads 5 of various different diameters, respectively.

Figure 17:
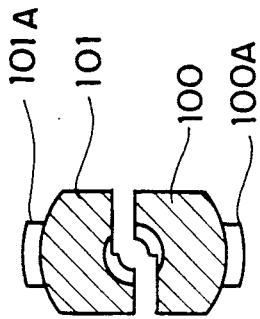
FIGS. 17a, 17b, 17c are sectional views taken on line A—A of FIG. 15, on line B—B of FIG. 15 and on line C—C of FIG. 16, respectively.
Figure 17:
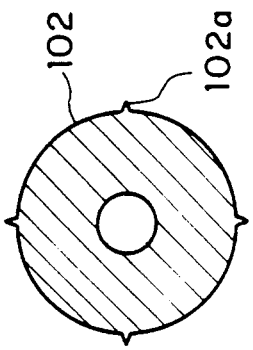
Figure 17:
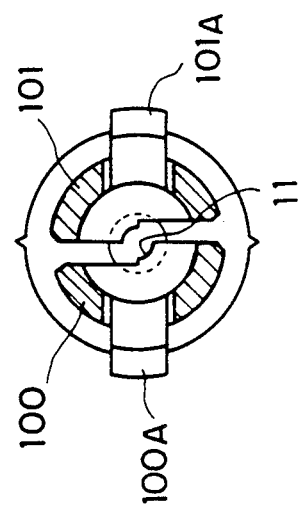

FIGS. 14 to 17c illustrate a third embodiment of the present invention. The third embodiment is different from the second embodiment in that an openable capping structure 10 employed in the third embodiment is received entirely in a lead cartridge 2. As illustrated in FIGS. 17a and 17c, the front portion of the openable capping structure 10 is slotted along two parallel planes extending in parallel to and on both sides of the longitudinal center axis of the openable capping structure 10 to form a pair of chucking tongues 100 and 101. A pair of fingers 100A and 101A are formed to enhance the resilience of the chucking tongues 100 and 101. The number of the fingers 100A and 101A is not limited to two, but may be a number greater than two. An annular groove 108 is formed in the front portion 106 of the chucking tongues 100 and 101 and a compressive elastic member 109 is placed in the annular groove 108 to bend the elastic chucking tongues 100 and 101 radially inward so that a lead passage 11 defined by the elastic chucking tongues 100 and 101 is closed. In the third embodiment, an elastic O-ring is employed as the compressive elastic member 109, however, the compressive elastic member 109 may be a compressive member of any type, such as a washer or a C-ring made of a synthetic resin, provided that the comressive member is capable of radial compression. The compressive member 109 bends the elastic chucking tongues 100 and 101 resiliently and radially inward so that the diameter of the lead passage 11 is variable to pass leads 5 having different diameters, respectively, therethrough. The compressive force of the compressive member 109 is so designed that the diameter of the lead passage 11 is reduced to a value below 0.5 mm naturally when the openable capping member 10 is for a lead cartridge containing leads of 0.5 mm in diameter and also when the openable capping member 10 is for a lead cartridge containing leads of 0.5 mm or 0.7 mm in diameter. Accordingly, there is no possibility of both the leads 5 of 0.5 mm in diameter and those of 0.7 mm in diameter falling off the lead cartridge provided with the openable capping structure 10 when the lead passage 11 is closed. However, the compressive member 109 need, such as an O-ring, need not necessarily be provided in the annular groove 108.

Figure 14:
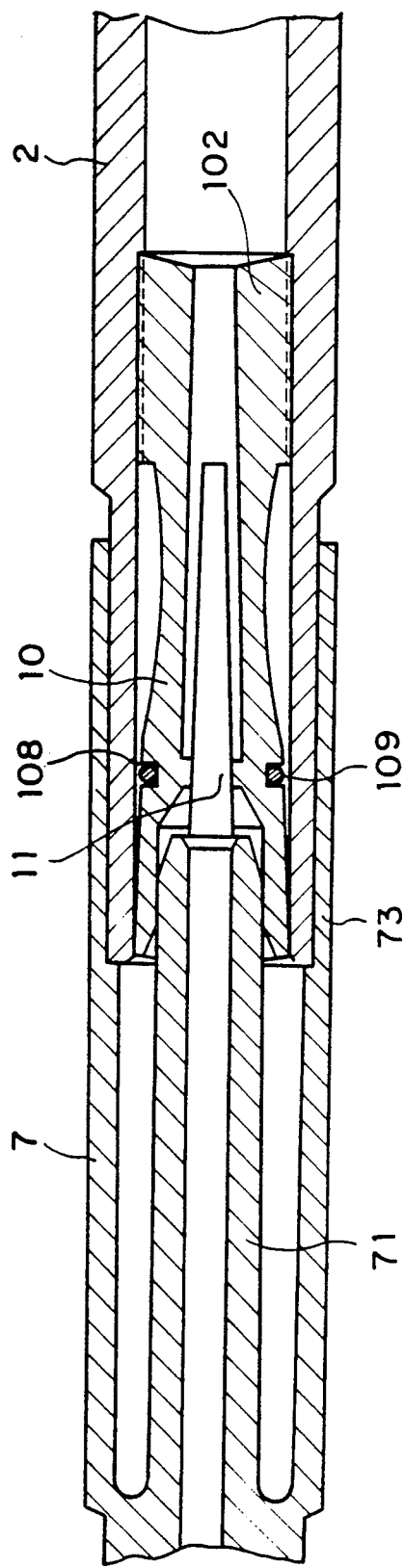
FIG. 14 is a fragmentary longitudinal sectional view of a third embodiment of the present invention.

It is also possible to give the openable capping structure 10 sufficient resilinece to restore the chucking tongues to their original position where the chucking tongues close the lead passage 11 by forming the body of the openable capping structure 10 in a form varying in cross-sectional area along the longitudinal axis thereof as illustrated in FIGS. 14 to 16. The fingers 100A and 101A further enhance the resilience of the chucking tongues 100 and 101. As illustrated in FIG. 17b, projections 102a are formed on the outer circumference of the rear portion 102 of the openable capping structure 10 to ensure the engagement of the lead cartridge 2 and the openable capping structure 10. In the third embodiment, the front portion of the openable capping structure 10 is slotted into two portions along two parallel planes extending in parallel to and on both sides of the longitudianl center axis of the openable capping structure 10, because the lead passage 11 is not formed and only slits are formed between the chucking tongues 100 and 101 when the width of the slits between the chucking tongues 100 and 101 and the diameter of the lead passage 11 is approximately the same or when the width of the slits is greater than the diameter of the lead passage 11, if the front portion of the openable capping structure 10 is slotted diametrically.

Furthermore, the front portion of the openable capping structure 10 may be slotted diametrically into a plurality of chucking tongues, for example, into two or three chucking tongues, as illustrated in FIGS. 13a and 13c. The division of the front portion of the openable chucking structure 10 into a plurality of elastic chucking tongues enlarges the range of bending motion of the elastic chucking tongues 100 and 101. Accordingly, as illustrated in FIG. 13, the lead passage 11 is opened in a diameter large enough to allow the leads 5 of a different diameter as well as those of the same diameter to be fed smoothly.

FIG. 18 illustrates a fourth embodiment of the present invention. The fourth embodiment is different from the third embodiment only in that the fourth embodiment is not provided with the fingers. The fourth embodiment, similarly to the third embodiment, does not necessarily require the compressive member 109.

FIG. 19 illustrates a fifth embodiment of the present invention. The fifth embodiment is different from the third embodiment only in that, in the fifth embodiment, an openable capping structure projects from the front end of a lead cartridge 2 instead of being entirely received in the lead cartridges 2, and the fingers are not provided. Also, in the fifth embodiment, the compressive member 109 is not an essential member.

Figure 20:
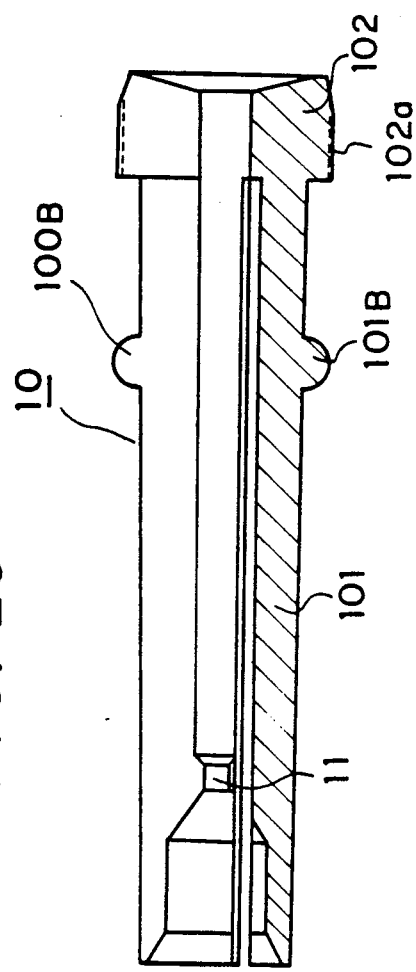
FIG. 20 is a partly sectional plan view of a sixth embodiment of the present invention.
Figure 21:
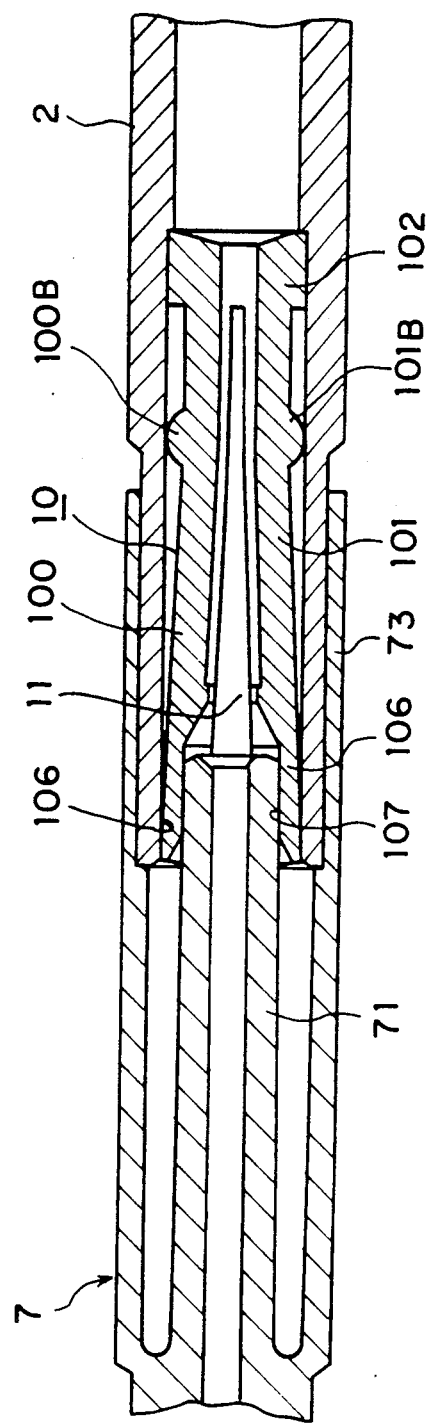
FIG. 21 is a sectional view of the sixth embodiment as fitted in a mechanical pencil.
Figure 29:
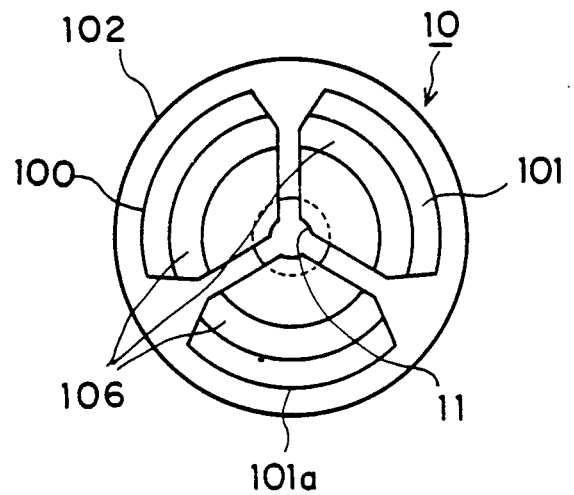
FIGS. 29 and 30 are end views of openable capping structures.
Figure 30:
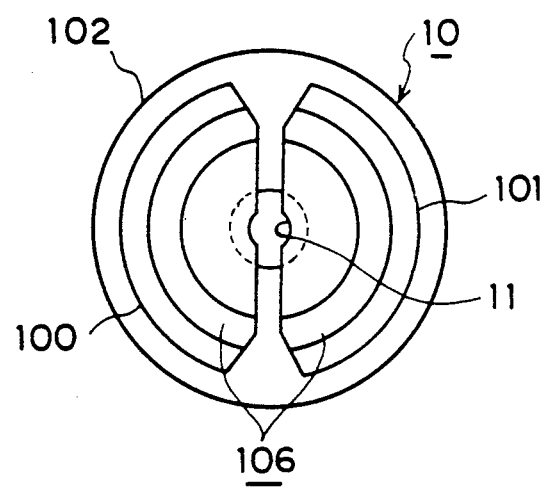

FIGS. 20 and 21 illustrate a sixth embodiment of the present invention. The front portion of an openable capping structure 10 employed in the sixth embodiment is divided into a plurality of equal chucking tongues 100 and 101 (and 101a), for example, into or three chucking tongues. The openable capping structure 10 including the chucking tongues 100 and 101 (and 101a) is received entirely in a lead cartridge 2 with the rear portion 102 thereof closely engaging the inner circumference of the lead cartridge 2. Protrusions 100B and 101B each having a semicircular cross section for limiting the degree of opening of the chucking tongues 100 and 101 are formed on the outer surface of the chucking tongues 100 and 101 so as to be in contact with the inner circumference of the lead cartridge 2. The protrusions 100B and 101B enhance the resilience of the chucking tongues 100 and 101 tending to bend the chucking tongues 100 and 101 radially inward and enhance the force of engagement of the lead guide receiving hole 107 with the inner rear cylindrical portion 71 of the lead guide 7.

When the openable capping structure 10 engages the inner rear cylindrical portion 71 of the lead guide 7, a lead passage 11, similarly to those of the foregoing embodiment, is opened to allow leads having a different diameter as well as those having the same diameter to pass therethrough.

FIGS. 22 to 26 illustrate a seventh embodiment of the present invention. An openable capping structure 10 employed in the seventh embodiment has a rear portion 102 to be fitted in a lead cartridge 2 and three chucking tongues 100, 101 and 101a (FIG. 24) or two chucking tongues 100 and 101 (FIG. 25) formed by radially slotting a front portion. The chucking tongues 100, 101 (and 102) have tendency to bend elastically radially inward and are capable of being radially outward to form a lead passage 11 capable of allowing the lead 5 having a different diameter as well as those having the same diameter to pass therethrough. That is, when the openable capping structure 10 is to be used for lead cartridges 2 containing leads having the same specific diameter, the openable capping structure 10 is designed so that the lead passage 11 is opened in a diameter allowing only leads having a specific diameter, for example, 0.5 mm, 0.7 mm or 0.9 mm, when the respective oblique extensions 106a and 106b (and 106c) of the chucking tongues 100 and 101 (and 102) engage the inner circumference of the chucking tongue receiving hole 72a of a lead guide 7, and when the openable capping structure 10 is to be used for lead cartridges 2 each containing leads having a diameter different from those of the leads contained in other lead cartridges 2, the lead passage 11 is opened in a diameter allowing all kinds of the leads having different diameters, for example, 0.5 mm and 0.7 mm, to pass therethrough when the oblique extensions 106a and 106b (and 106c) engage the inner circumference of the chucking tongue receiving hole 72a of the lead guide 7 and the lead passage 11 is narrowed in a diameter capable of inhibiting the passage of the leads having any diameter.

The front end of the lead passage 11 is tapered rearward to form a taper surface 105. The oblique extensions 106a and 106b (and 106c) are formed integrally with the chucking tongues 100 and 101 (and 102), respectively, so as to extend obliquely rearward. The diameter of a circle passing the outer ends of the oblique extensions 106a and 106b (and 106c) is greater than the diameter of the chucking tongue receiving hole 72a of the lead guide 7. When the chucking tongues 100 and 101 (and 102) are pushed into the chucking tongue receiving hole 72a of the lead guide 7, the oblique extensions 106a and 106b (and 106c) engage the inner circumference of the chucking tongue receiving hole 72a elastically and are compressed radially inward, so that the chucking tongues 100 and 101 (and 102) are bent radially outward to open the lead passage 11. When the oblique extensions 106a and 106b (and 106c) are disengaged from the chucking tongue receiving hole 72a of the lead guide 7, the chucking tongues 100 and 101 (and 102) are allowed to be restored to their original positions by their own resilience to close the lead passage 11.

Thus, when the oblique extensions 106a, 106b and 106c formed integrally with the chucking tongues 100, 101 and 102, respectively, engage the lead guide 7, the lead passage 11 is opened, while when the oblique extensions 106a, 106b and 106c are disengaged from the lead guide 7, the lead passage 11 is closed. Thus, the seventh embodiment has the same effect as those of the foregoing embodiments.

FIG. 26 illustrates a variation of the seventh embodiment. In this variation, a tapered projection 76a tapering rearward is formed in the front end of the chucking tongue receiving hole 72a of the lead guide 7. The small end of the taper projection 76a is slightly smaller than the diameter of the lead passage 11 when closed. When the lead cartridge 2 is inserted into the outer cylinder 3 of a mechanical pencil, the tapered surface 105 of the lead passage 11 engages the taper projection 76a, while the oblique extensions 106a, 106b and 106c engage the inner circumference of the chucking tongue receiving hole 72a of the lead guide 7, and thereby lead passage opening action is further ensured.

FIGS. 27 to 30 illustrate an eighth embodiment of the present invention. A lead guide 7 associated with the eighth embodiment of the present invention is capable of feeding leads 5 one by one to the lead chuck 6 of a mechanical pencil. As illustrated in FIGS. 27 and 28, a chuck receiving hole 74 is formed in the front end of the front cylindrical portion 70 of the lead guide 7 and a lead guide passage 75 is formed through the lead guide 7 along the longitudinal center axis of the same. A cartridge receiving hole 77 is formed coaxially with the lead guide passage 75 in the rear portion of the lead guide 7 to receive a cartridge 2 slidably therein. The bottom of the cartridge receiving hole 77 is projected rearward to form a tapered projection 76. The chucking tongues of an openable capping structure 10 fitted in the lead cartridge 2 engage the taper projection 76 elastically when the lead cartridge is pushed forward, namely, toward the lead guide 7. The tapered projection 76 is tapered rearward. Stopping projections 77a for limiting the rearward movement of the lead cartridge 2 are formed on the inner circumference of the cartridge receiving hole 77. The reduced front cylindrical portion 20 of the lead cartridge 2 is slidably and detachably fitted in the cartridge receiving hole 77 of the lead guide 7.

Projections 22 which come into abutment with the front sides of the stopping projections 77a of the lead guide 7, respectively, when the lead cartridge 2 is retracted are formed on the outer circumference of the reduced front cylindrical portion 20 of the lead cartridge 2. When the reduced front cylindrical portion 20 of the lead cartridge 2 is pushed forcibly into the cartridge receiving hole 77, the projections 22 of the lead cartridge 2 pass over the stopping projections 77a of the lead guide 7, and thereby the lead cartridge 2 is axially slidably coupled with the lead guide 7.

When the lead cartridge 2 is pushed forward after being thus coupled with the lead guide 7, the projections 22 are separated from the stopping projections 77a of the lead cartridge, and when the force to push the lead cartridge 2 forward is removed, the lead cartridge 2 is moved rearward as far as the projections 22 come into abutment with the stopping projections 77a of the lead guide 7, and thereby the rearward movement of the lead cartridge 2 is limited.

The openable capping structure 10 has a rear cylindrical portion 102 having an outside diameter substantially the same as the inside diameter of the lead cartridge 2 and suitable for fixedly retaining the openable capping structure 10 within the lead cartridge 2, and a front portion 106 radially slotted into a plurality of sections, for example, into three sections (FIG. 29) or two sections (FIG. 30) to form chucking tongues 100 and 101 (and 101a). The openable capping structure 10 is pressed in the lead cartridge 2 so as to be fixedly retained in place.

Normally, the chucking tongues 100 and 101 (and 101a) are bent radially inward. The chucking tongues 100 and 101 (and 101a) are capable of being bent radially and elastically. A lead passage 11 having a diameter allowing leads 5 having different diameters as well as those having the same diameter to pass therethrough. The lead passage 11 is opened when the lead cartridge 2 is pushed forward and thereby the front ends of the chucking tongues 100 and 101 (and 101a) are pressed against the tapered projection 76 of the lead guide 7. The lead passage 11 is closed when the chucking tongues 100 and 101 (and 101a) are released from the tapered projection 76 by removing the force applied to the lead cartridge 2 to push the same forward. In this embodiment, a substantially annular groove 108 is formed in the outer circumferences of the chucking tongues 100 and 101 (and 101a) and a compressive member 109 for compressing the chucking tongues 100 and 101 (and 101a) radially inward is provided in the annular groove 108. The compressive member 109 compresses the chucking tongues 100 and 101 (and 101a) elastically so that the chucking tongues 100 and 101 (and 101a) can be elastically bent radially outward by the taper projection 76 of the lead guide 7 to allow the leads 5 having the same or different diameters to pass through the openable capping structure 10 when the lead cartridge 2 is pushed forward. When the force applied to push the lead cartride 2 forward is removed from the lead cartridge 2, the chucking tongues 100 and 101 (and 101a) are restored to the original position to close the lead passage 11 in a diameter capable of inhibiting the passage of the leads 5 of different diameters, for example, 0.5 mm and 0.7 mm, as well as those of the same diameter, for example, 0.5 mm, through the lead passage 11. When the openable capping structure 10 is to be used for lead cartridges for containing leads of 0.5 mm, 0.7 mm and 0.9 mm in diameter, the diameter of the lead passage 11 when closed in less than 0.5 mm. Accordingly, the leads 5 regardless of diameter are unable to fall off the lead cartridge 2 when the lead passage 11 is closed. The compressive member 109, such as an elastic O-ring, need not necessarily be provided in the annular groove 108. Forming the body of the openable capping structure 10 in a shape having axially varying cross section as illustrated in FIGS. 27 and 28 enables the chucking tongues 100 and 101 (and 101a) to be restored to the original position by their own resilience.

The openable capping structure 10 thus constituted engages the lead guide 7 to open the lead passage 11 when the lead cartridge 2 is pushed forward, while the openable capping structure 10 is separated from the lead guide 7 to close the lead passage 11 when the force applied to the lead cartridge 2 is removed. Thus the eighth embodiment functions in the same manner as the foregoing embodiments. Furthermore, since the openable capping structure 10 is accommodated entirely in the front portion of the lead cartridge and is controlled by the lead guide 7, the chucking tongues are never subjected to undesirable external force tending to open the lead passage 11 while the lead cartridge 2 is carried.

FIGS. 31 and 32 illustrate a ninth embodiment of the present invention. An openable capping structure 10 in the ninth embodiment is formed of an elastic material, such as a rubber or a synthetic resin, substantially in a cylindrical form. The openable capping structure 10 is fitted in the front end of a lead cartridge 2. A flange 103 is formed at the front end of the openable capping structure 10.

Similarly to the foregoing embodiments, a lead passage 11 having a diameter allowing the passage therethrough of leads 5 having different diameters as well as those having the same diameter is formed in the openable capping structure 10 along the longitudinal center axis of the same. Slits may be formed in the vicinity of the lead passage 11 to further ensure the opening and closing of the lead passage 11. A lead guide receiving hole 107a is formed in the front portion of the openable capping structure 10 and a taper surface 105 is formed in the bottom wall of the lead guide receiving hole 107a around the lead passage 11. As illustrated in FIG. 32, when the openable capping structure 10 is disposed in place, the inner rear cylindrical portion 71 of a lead guide 7 is received closely in the lead guide receiving hole 107a and presses the bottom wall of the lead guide receiving hole 107a to open the lead passage 11.

Thus, the lead passage 11 is opened when the openable capping structure 10 engages the lead guide 7 and is closed when the openable capping structure 10 is disengaged from the lead guide 7. Thus, the ninth embodiment functions similarly to the foregoing embodiments.

Figure 33:
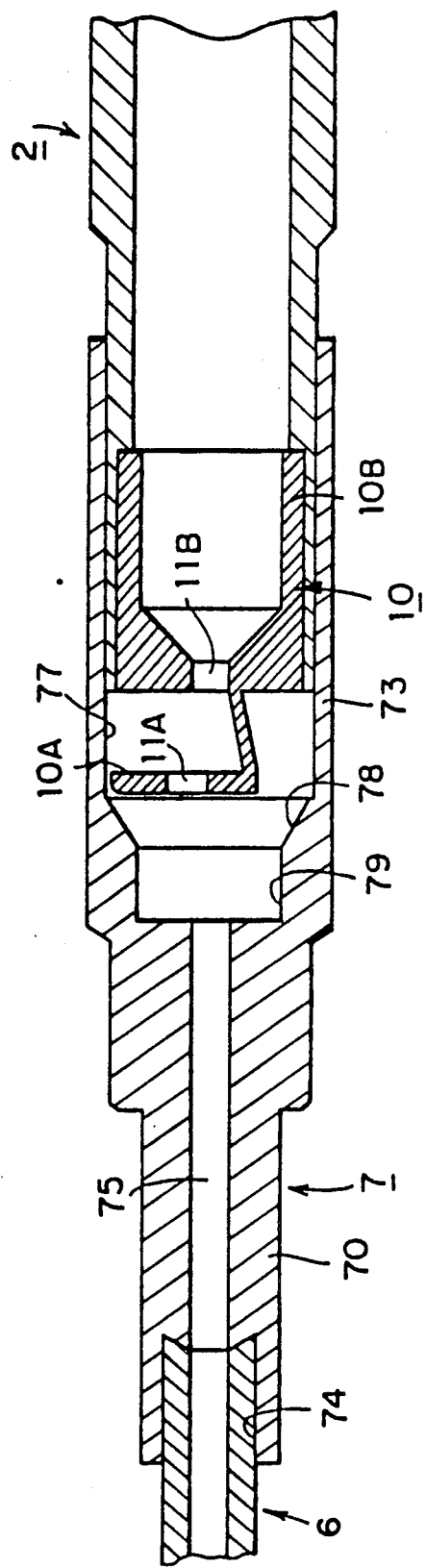
FIGS. 33 and 34 are longitudinal sectional views of a tenth embodiment of the present invention.
Figure 34:
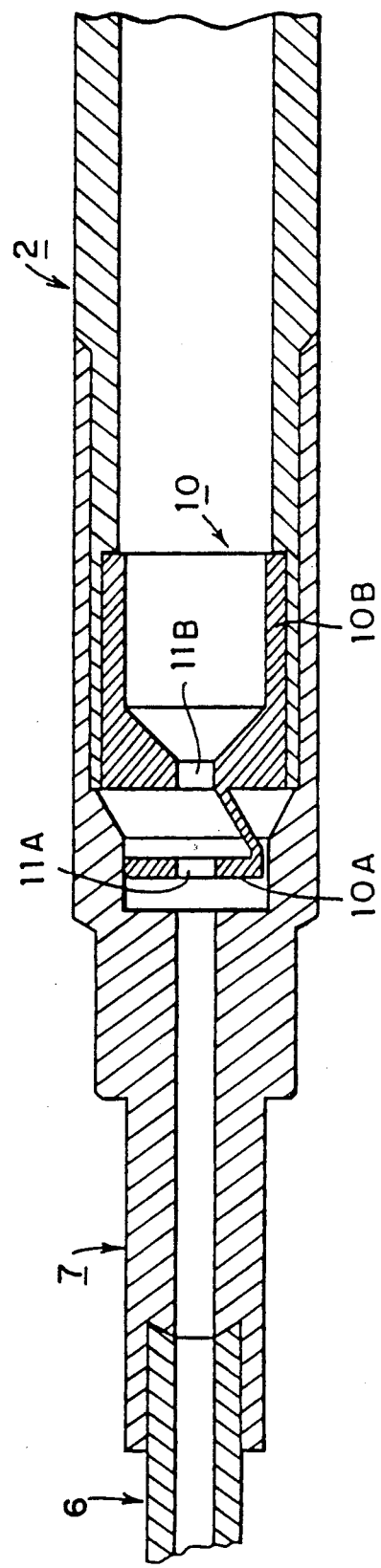

FIGS. 33 and 34 illustrate a tenth embodiment of the present invention. A lead guide 7 to be used in combination with the tenth embodiment has a front cylindrical portion 70 and a rear cylindrical portion 73 extending coaxially with the front cylindrical portion 70 as illustrated in FIGS. 33 and 34. The lead guide 7 is designed to feed leads 5 one by one. A lead chuck receiving hole 74 for receiving the rear end of a lead chuck 6 is formed in the front end of the front cylindrical portion 70, and a lead guide passage 75 having a diameter allowing the passage of only one lead 5 at a time is formed through the front cylindrical portion 70 coaxially with the lead chuck receiving hole 75. A lead cartridge receiving hole 77 is formed in the rear end of the rear cylindrical portion 73. A tapered surface 78 for guiding a lead stopping disk 10A, which will be described later, and a cylindrical surface 79 for locating the lead stopping disk 10A so that tow lead passages 11A and 11B are aligned are formed in the bottom wall of the lead cartridge receiving hole 77.

An openable capping structure in the tenth embodiment is formed of an elastic material, such as a rubber or a synthetic resin, and is fitted in the front end of a lead cartridge 2 in a manner as shown in FIGS. 33 and 34. The openable capping structure 10 has a cylindrical body 10B provided with the coaxial first lead passage 11B, and the lead stopping disk 10A provided with the coaxial second lead passage 11A. Normally, the lead stopping disk 10A is dislocated relative to the cylindrical body 10B so that the first lead passage 11B and the second lead passage 11A disagree with each other. The lead stopping disk 10A is connected to the cylindrical body 10B by an arm obliquely extending from the cylindrical body 10B.

The first lead passage 11B and the second lead passage 11A are formed in a size allowing the passage of the leads 5 of the same diameter, such as 0.5 mm, 0.7 mm or 0.9 mm, or in a size allowing the passage of the leads 5 of different diameters, such as 0.5 mm and 0.7 mm. That is, the lead passages 11A and 11B having the former size allow the passage of the leads 5 having a specific size, such as 0.5 mm, 0.7 mm or 0.9 mm, when the lead cartridge 2 is joined to the lead guide 7 and thereby the lead passages 11A and 11B are aligned with each other, while the lead passages 11A and 11B having the latter size allow the passage of the leads 5 having different diameters, for example, 0.5 mm and 0.7 mm), respectively, when the lead cartridge 2 is joined to the lead guide 7 and thereby the lead passages 11A and 11B are aligned with each other.

Thus, when the lead cartridge 2 is disengaged from the lead guide 7, the lead passages 11A and 11B formed in the lead stopping disk 10A and the cylindrical body 10B, respectively, of the openable capping structure 10 disagree with each other as shown in FIG. 33, so that the leads 5 are unable to pass through the lead passages 11A and 11B.

When the lead cartridge 2 joined to the lead guide 7 as shown in FIG. 34 is separated together with the openable capping structure 10 from the lead guide 7 to change the lead cartridge 2 for a new one or to inspect the lead, the lead stopping disk 10A is deviated relative to the cylindrical body 10B by the resilience of the arm 10 interconnecting the lead stopping disk 10A and the cylindrical body 10B to a position shown in FIG. 33. Consequently, the lead passages 11A and 11B disagree with each other to inhibit the passage of the lead 5 therethrough. Thus, the tenth embodiment has the same effect as those of the foregoing embodiment.

As is apparent from what has been described hereinbefore, the lead cartridge according to the present invention is provided with an openable capping structure having chucking tongues which are bent radially outward to open a lead passage when the lead cartridge is joined elastically to the lead guide of a mechanical pencil and are restored to the original position by their own resilience and/or a compressive member to close the lead passage when the lead cartridge is separated from the lead guide. Accordingly, there is no possibility of the leads contained in the lead cartridge falling off the lead cartridge in replacing the lead cartridge and, furthermore, the lead remaining in the mechanical pencil can be chucked by the chucking tongues and can be withdrawn from the mechanical pencil when the lead cartridge is removed from the mechanical pencil. Therefore, the breakage of the lead remaining within the mechanical pencil and the clogging of the lead chuck of the mechanical pencil with the broken pieces of the lead never occurs and the lead cartridge can be very simply and easily replaced.

Furthermore, the openable capping structure according to the present invention is applicable to lead cartridges respectively for containing leads having different diameters as well as to lead cartridges for containing leads having the same diameter and does not include any part to be thrown away. Furthermore, since the outer cylinder of a mechanical pencil to be used in combination with the lead cartridge of the present invention need not have any inner expansion, the outer cylinder can be formed through extrusion molding and a lead cartridge having an increased capacity can be inserted in the outer cylinder.

What is claimed is:

1. A lead cartridge comprising:
a cartridge body for being detachably fitted into a mechanical pencil having a lead guide, said lead guide being provided with a rearwardly extending cylindrical portion adapted to guidingly receive a single lead, said cartridge body having an open front end and a diameter sufficient to receivably contain a plurality of leads therein; and
closure means, fixed to said lead cartridge intermediate said cartridge body and said lead guide, for releasably sealing said cartridge body, said closure means being releasably movable between a first position and a second position, said closure means in said first position preventing extension out of said cartridge body of any of said plurality of leads contained therein, said closure means in said second position permitting any single lead of said plurality of leads contained in said cartridge body to pass out of said cartridge body into said lead guide, said closure means being resiliently biased to said first position, said closure means and said rearwardly extending cylindrical portion of said lead guide cooperating to hold said closure means in said second position when said cartridge body is fitted into said mechanical pencil, wherein said closure means comprises abutting means, defined by tapered surfaces formed at a rear end of said closure means, for abutting said rearwardly extending cylindrical portion of said lead guide, said rear end of said closure means being cylindrically shaped and disposed within said open front end of said cartridge body.

2. A lead cartridge comprising:
(a) a cartridge body for storing a plurality of leads, said cartridge body being detachably receivable in a mechanical pencil having a lead guide, said lead guide being provided with an inner rear cylindrical portion through which said leads are fed one at a time and a front cylindrical portion having a receiving hole for receiving a rear end of a lead chuck; and
(b) an openable capping structure formed of an elastic material and having a front and rear end, said openable capping structure being in a substantially cylindrical form and fixedly joined at said rear end into an open front portion of said cartridge body, said openable capping structure having a lead guide receiving hole, formed at said front end of the capping structure, and a lead passage formed at a center of a tapered structure on a bottom wall of said lead guide receiving hole at said rear end of said capping structure, said inner rear cylindrical portion of said lead guide being closely received in said lead guide receiving hole for releasably moving said capping structure between a first position and a second position when said cartridge body is received in said mechanical pencil, said lead passage having a variable diameter allowing the individual passage of leads, when in said first portion, said inner rear cylinder portion of said lead guide is closely received in said lead guide receiving hole of said capping structure and abutting said tapered surface thereof, and, when in said second position, said capping structure preventing the individual passage of leads when said inner rear cylindrical portion of said lead guide is not closely received in said lead guide receiving hole, said openable capping structure further comprising a flange provided at the front end of the capping structure.

3. A lead cartridge comprising:
(a) a cartridge body means for storing a plurality of leads and for being detachably push-fit into a mechanical pencil having a lead guide, said lead guide being receivable of said leads and being provided with a rearwardly extending cylindrical portion through which said leads are fed one at a time, said cartridge body means having an open front end; and
(b) capping means for closing said open front end of said cartridge body means until such time as said cartridge body means is push-fit into said mechanical pencil, said capping means comprising lead passage means for passing leads from said cartridge body means to said lead guide, said lead passage means being movable between a first position and a second position, said lead passage means when in said first position being closed sufficiently so that lead is securely retained in said cartridge body means, said lead passage means when in said second position being open so that lead can pass therethrough, said rearwardly extending cylindrical portion of said lead guide releasably moving said lead passage means between said first position and said second position when said cartridge body means is push-fit into said mechanical pencil, said lead passage means being resiliently biased to said first position, wherein said capping means comprises abutting means, defined by tapered surfaces formed at a rear end of said capping means, for abutting said rearwardly extending cylindrical portion of said lead guide, said rear end of said capping means being cylindrically shaped and disposed within said open front end of said cartridge body means, and wherein said capping means comprises a flange provided at an extreme front end of said capping means, said rearwardly extending cylindrical portion of said lead guide and abutting means cooperating to open said lead passage means sufficiently for lead to pass therethrough only when said cartridge body means is fully push-fit into said mechanical pencil.

4. A lead cartridge as recited in claim 3, wherein said capping means is formed as a single unit.

5. A lead cartridge as recited in claim 4, wherein said single unit is of an elastic material.

6. A lead cartridge as recited in claim 5, wherein said elastic material is elastomeric.

7. A lead cartridge as recited in claim 3, wherein said capping means is a forwardly-opening essentially cup-shaped member which includes a base member.

8. A lead cartridge as recited in claim 7, wherein said abutting means comprises an inside surface of said base member of said cup-shaped member.

9. A lead cartridge as recited in claim 8, wherein said abutting means is pressed rearwardly and outwardly by said rearwardly extending portion of said lead guide when said cartridge body means is fully push-fit into said mechanical pencil, to thereby cause said lead passage means to open sufficiently for lead to pass therethrough.

10. A lead cartridge as recited in claim 3, wherein said abutting means is pressed rearwardly and outwardly by said rearwardly extending portion of said lead guide when said cartridge body means is fully push-fit into said mechanical pencil, to thereby cause said lead passage means to open sufficiently for lead to pass therethrough.

* * * * *